US011156355B2

(12) United States Patent
Mas Sanz

(10) Patent No.: US 11,156,355 B2
(45) Date of Patent: Oct. 26, 2021

(54) WATER-TUBE BOILER WITH CONCENTRIC HEAT-EXCHANGE COILS WITH ASH-REMOVAL SYSTEM

(71) Applicant: Xavier Mas Sanz, Valencia (ES)

(72) Inventor: Xavier Mas Sanz, Valencia (ES)

( * ) Notice: Subject to any disclaimer, the term of this patent is extended or adjusted under 35 U.S.C. 154(b) by 0 days.

(21) Appl. No.: 17/053,827

(22) PCT Filed: Feb. 11, 2019

(86) PCT No.: PCT/ES2019/070071
§ 371 (c)(1),
(2) Date: Nov. 9, 2020

(87) PCT Pub. No.: WO2019/215355
PCT Pub. Date: Nov. 14, 2019

(65) Prior Publication Data
US 2021/0239312 A1    Aug. 5, 2021

(30) Foreign Application Priority Data

May 10, 2018   (ES) .................................. P201830460

(51) Int. Cl.
*F22B 21/26*         (2006.01)
*F22B 37/14*         (2006.01)

(52) U.S. Cl.
CPC .................... *F22B 37/146* (2013.01)

(58) Field of Classification Search
CPC ...... F22B 37/146; F22B 37/142; F22B 27/12; F22B 21/26; F22B 21/28; F22B 21/22; F22B 27/04; F23J 1/00; F23J 2900/01009; F28D 11/02
See application file for complete search history.

(56) References Cited

U.S. PATENT DOCUMENTS

| 19,969 A | 4/1858 | Scott |
| 848,564 A | 3/1907 | Mitchell |
| 2,037,490 A | 4/1936 | Vorkauf |
| 2,507,293 A * | 5/1950 | Arant ............... F22B 37/142 122/250 R |
| 4,377,202 A * | 3/1983 | Nakamura ............... B01D 1/02 159/25.1 |

(Continued)

FOREIGN PATENT DOCUMENTS

| CN | 2333897 Y | 8/1999 |
| DE | 2534092 A1 | 2/1977 |

(Continued)

*Primary Examiner* — Gregory A Wilson
(74) *Attorney, Agent, or Firm* — The Webb Law Firm

(57) ABSTRACT

The disclosure relates to a water-tube boiler with concentric heat-exchange coils with an ash-removal system, which includes a coil-shaped heat-exchange tube forming a coil with layers having a section concentric with the turns of the coils joined laterally, wherein when the boiler is operational, the heat-exchange tube turns with a rotary movement on the axis of the coil and is heated via a forced-ventilation hot-air intake that flows through the layers having a concentric section in order to generate a movement of the ash and the slag, moving them through the layers having a concentric section following a path, allowing them to be extracted via output collectors.

7 Claims, 3 Drawing Sheets

(56) References Cited

U.S. PATENT DOCUMENTS

| | | | | |
|---|---|---|---|---|
| 6,050,227 A | * | 4/2000 | LaMotte | F28G 3/166 |
| | | | | 122/379 |
| 9,140,446 B2 | * | 9/2015 | Higgins | F23C 9/00 |
| 2019/0271463 A1 | * | 9/2019 | Dancey | F23C 3/002 |

FOREIGN PATENT DOCUMENTS

| | | | | | |
|---|---|---|---|---|---|
| EP | 0053952 | A1 | | 6/1982 | |
| GB | 1221521 | A | * | 2/1971 | F22B 21/26 |
| WO | WO 88/04754 | A1 | | 6/1988 | |

\* cited by examiner

WATER-TUBE BOILER WITH CONCENTRIC HEAT-EXCHANGE COILS WITH ASH-REMOVAL SYSTEM

CROSS-REFERENCE TO RELATED APPLICATIONS

This application is the United States national phase of International Application No. PCT/ES2019/070071 filed Feb. 11, 2019, and claims priority to Spanish Patent Application No. P201830460 filed May 10, 2018, the disclosures of which are hereby incorporated by reference in their entirety.

BACKGROUND OF THE INVENTION

Field of the Invention

The present disclosure is applicable in any industrial process that requires the production of heat energy generation by means of fuels with a significant ash or slag content, more especially for application thereof in the event that the arrangement of the boiler exchange body must be oriented in a horizontal position, due to installation requirements or limitations, also having application in boilers oriented in a vertical direction.

The disclosure comprises a system for eliminating slag and ash from inside a boiler by applying a rotary movement to the heat exchanger and taking advantage of the intake hot-air stream, moving that slag or ash to an output collector.

Description of Related Art

At present, the existence of water-tube boilers equipped with coils forming concentric tubular structures oriented in a vertical or horizontal position is known. In the operation of these boilers, the water steam passes through the interior of the tubes where the hot gases produced in the combustion are in contact with the outer faces of the conduits, which are heated, obtaining high temperatures and pressures at high performance with a small volume of water.

The fluid that passes through the interior of the conduits to be heated requires an adequate quality to avoid encrustations inside these conduits, being susceptible to the pressure and load fluctuations resulting from the process.

The process carried out in these machines requires a complex and expensive maintenance, especially due to the great drawback they exhibit when solid fuels are used that generate slag and ash, a problem that is particularly aggravated when the ash content thereof is greater than 2%. This is due to the fact that they settle on the heat-exchange conduits, which reduces the capacity for hours of continuous operation, given the drop in performance due to the fouling produced by the volatiles, until the boiler is inoperative.

This problem is more pronounced in horizontally oriented boilers, since in vertical ones, the coil also being vertically oriented, the combustion direction favours the deposition of a large part of the ashes on the lower base of the tank by gravity, for a subsequent cleaning, while in the horizontal ones, the ashes fall on the coil itself without the possibility of removing them by conventional means.

Currently, and due to these problems, horizontal boilers of this type do not contemplate the use of fuels with any associated ash content due to the constant loss of performance and the need to make stops that affect the production process to recover a certain portion of that performance.

Document U.S. Pat. No. 2,037,490A describes a horizontal water-tube boiler which comprises a turn of the heat exchanger. The ashes originating from the combustion are not deposited on the conduits but are transported only by means of centrifugal force to hoppers located in the lower portion of the boiler and from there they pass to the collectors, where they are collected.

This heat exchanger is made up of a series of tubes separated at a certain distance, arranged by way of spokes, joined at one end thereof by perforated plates, forming a cylindrical contour, and at the other end to a rotary shaft with respect to which, the conduits rotate. This arrangement is not that of a coil, since it has the centre of rotation occupied by the transmission shaft, and there is not a forced-ventilation circuit for the removal of the slag, but rather a single movement thereof through the surfaces of the conduits. By having the perforated plates on the outer portion, the outer portion of the outer tubes does not receive temperature exchange, having a low performance.

Document EP0053952A1 discloses an incinerator with a horizontal rotary furnace slightly inclined with respect to the ground. This invention is aimed at treating industrial waste with the objective of producing energy by combustion. The heat exchanger is made up of concentrically-arranged coils for the water with a boiler with a coil for recovering the heat from the combustion fumes.

The slag does not circulate through these concentric coils, nor does it move across the surface thereof to the extraction points, since they have separate conduits, and the slag does not follow a transport cycle as it falls through the generated openings. The rotational movement generated in the boiler is not intended for removing slag, but rather is a compulsory consequence of the rotation of the furnace, since a final evacuation of slag is not appreciated.

Document WO8804754A1 refers to a water-tube boiler slightly inclined with respect to the horizontal, which comprises a series of concentric tubes for water/steam. These tubes rotate about a longitudinally positioned axis, not in a spiral, intermediaries that do not direct the slag to the extraction thereof.

Document CN2333897Y discloses a machine for slag cooling by water in a fluidised bed boiler. The machine comprises a horizontal rotating roller, spiral grooves on the outer face of the roller and a concentric coil inside the roller formed by multiple spiral tubes, through which the hot slag advances. The objective of the rotation is a greater heat exchange, not ash extraction. Although the conduits are spiral-shaped, the objective of this invention is slag cooling and not slag removal via the rotation of the heat-exchange conduits.

In the entire state of the art there is no presence of a boiler similar to that described in this disclosure, wherein there is an extraction of slag and ashes originating from the combustion starting from the rotation of the heat exchanger and the pressure conditions generated by the draught fan inside the boiler. The advantage of this invention with respect to the existing ones is given by using the spiral conduit to carry out the heat exchange and the slag transfer for extraction thereof, improving the heat exchange between the intake air and the fluid.

Moreover, these inventions do not have the concept of various gas passages through different layers that generate a path of ash and slag inside the boiler, causing an evolutionary leap in the design of rotary boilers with automatic cleaning capacity.

SUMMARY OF THE INVENTION

The solution presented by the disclosure is based on obtaining a water-tube boiler equipped with a rotating temperature-exchange body that facilitates the extraction of slag simultaneously with the temperature exchange by the gases produced by any type of emitting source.

The boiler of the disclosure can use as fuel both gases and solids that generate ashes or slag during combustion, so that, after start-up thereof, it does not require any maintenance intervention due to an automatic cleaning system.

The water-tube boiler of the disclosure consists of a coil-shaped heat-exchange tube, forming layers having concentric section, with the turns of the coils joined laterally, wherein, while the boiler is operational, the heat-exchange tube turns with a rotary movement on the axis of the coil and is heated via a forced-ventilation hot-air intake that flows through the layers having a concentric section in order to generate a movement of the ash and the slag, moving them through the layers having a concentric section following a path, allowing them to be extracted via output collectors.

The approach is that, as the slag is placed on the heat-exchange tube, the slow rotational movement applied thereto causes the impurities to move along the surface thereof like a worm screw, passing between the layers formed by the heat-exchange tube, until it ends on the bottom of the boiler, in order to be extracted by conventional means via a slag extracting element.

One of the main novelties is the fact that the concentric coils are especially arranged such that the walls of the cylindrical conduits are joined, reducing the contact surface with the gases, but enabling the progressive decanting of the ash waste until the fall thereof to the lower zone.

In one embodiment, the heat-exchange tube is in the shape of a cylindrical coil while in another embodiment, the heat-exchange tube is in the shape of a conical coil.

In the case of having a conical coil shape, each one of the layers formed by the heat-exchange tube, have alternately inverse conicities that facilitate the fall of the ash and slag between the layers.

This conicity of the coils is not a determining factor, but a facilitator of the process that improves the advancement of the slag.

The turns of the coil formed by the heat-exchange tube have an inclination in opposite directions with respect to the vertical alternately for each layer, so that, in the innermost layer, the turns are slightly inclined towards one side, while in the following layer, the turns are slightly inclined towards the opposite side, as if it were a reverse threading, the inclination between each layer varying. In this way, the ashes make a zig-zag path passing through all the layers from the innermost to the outermost one.

In one embodiment, the rotary movement of the heat-exchange tube is generated by a rotor located outside the boiler.

In one embodiment, the rotation of the coil is solved by means of the use of rotary valves that enable the rotation thereof and at the same time the transmission of the fluid both to the intake and the output coil.

In one embodiment, the forced-ventilation hot-air intake which flows through the layers having a concentric section is generated by means of a forced-draught fan. This fan that forces the hot air to pass through the boiler is outside said boiler.

The performance of the boiler of the invention is superior to that of the boilers without this configuration, by improving the heat exchange. In the same way, by reducing the abrasion generated on a portion of the coil, the possible hours of use of the boiler are increased. This is due to the fact that, usually, the gases generated in the combustion are not evenly distributed inside the boiler, especially if this is located horizontally, in such a way that the rotary movement of the heat-exchange tube does generate a regular exchange over the entire surface thereof.

In other words, the use of the heat-exchange tube configured as a slag transfer mechanism in addition to the energy exchange, implies an improvement with respect to the existing technology.

The heat-exchange tube can work with different types of fluids such as water or industrial thermal oil, without being limited by the rotational nature thereof.

The automatic cleaning system does not require the stopping of the heat-exchange process and enables the elimination of peripheral equipment intended for this use, obtaining the same result, reducing the investment costs of the boiler.

No model has been found in the background that is capable of producing the same performance as the proposed model according to the conjunction entailed by all the features exhibited by joining the action of the centrifugal force of the rotation and the suction of the fan. In other words, this concept of rotation and suction of the gases, configures a boiler with a higher performance than other models lacking these features.

BRIEF DESCRIPTION OF THE DRAWINGS

To complete the description of the disclosure, and for the purpose of helping to make the features thereof more readily understandable, according to a preferred exemplary embodiment thereof, a set of drawings is included wherein, by way of illustration and not limitation, the following figures have been represented.

DESCRIPTION OF THE INVENTION

The present disclosure relates to a boiler, preferably horizontally oriented, which uses as fuel both gases and solids that generate ashes or slag during combustion thereof, such that, after start-up thereof, it does not need to be stopped or intervened with for carrying out cleaning tasks.

Figure 1:
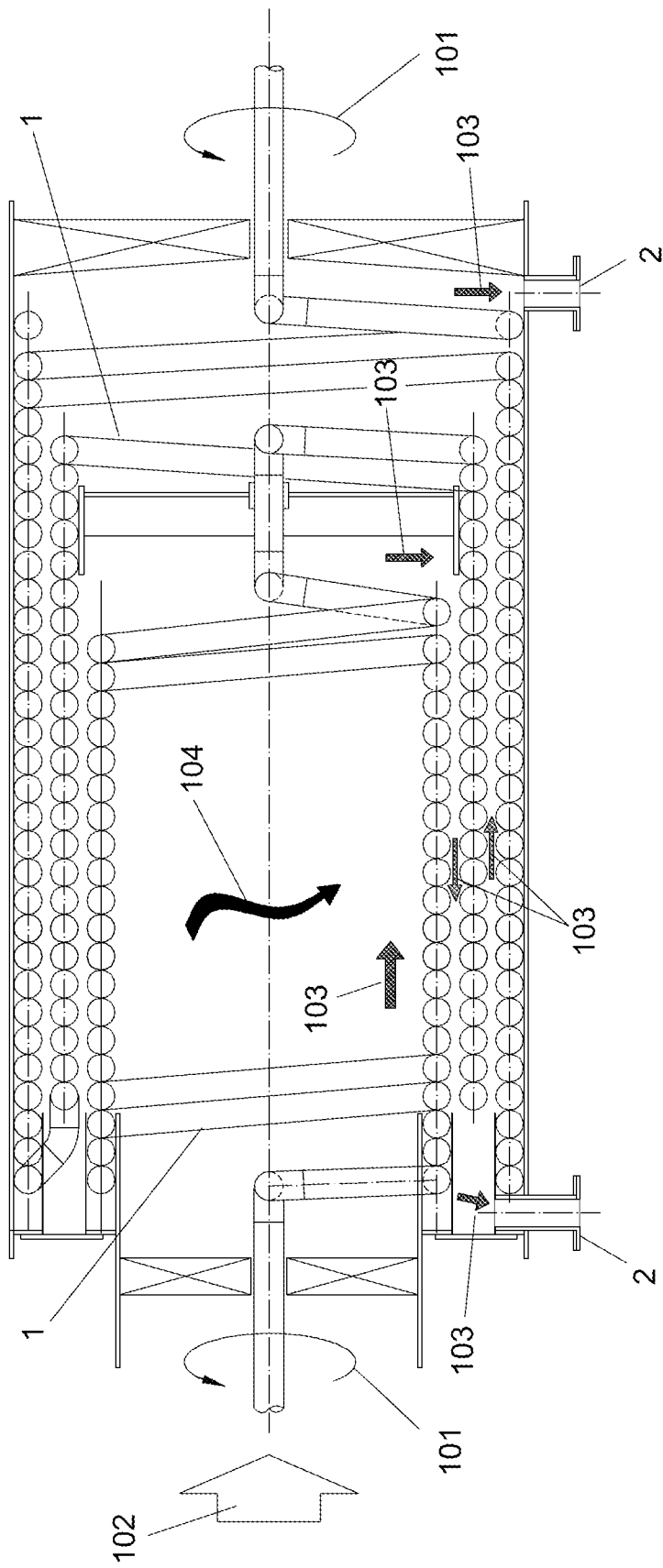
FIG. 1 represents a cross-sectional elevation view of the water-tube boiler wherein the heat-exchange tube is shown formed by three layers in the form of a cylindrical coil, concentric with each other, with the turns joined.

As can be seen in FIG. 1, the boiler is made up of a heat-exchange tube (1), housed inside the boiler, in the shape of a cylindrical coil the turns of which are joined, without any openings or separation between them.

The heat-exchange tube (1) forms three concentric cylindrical layers, with a small separation between them, which enables there to be a heat exchange surface of the entire conduit, by means of convection, superior to single-layer coils.

When the boiler is operational, the heat-exchange tube (1) rotates by means of a slow rotary movement (101) on the axis of the cylindrical coil and is heated via a forced ventilation hot-air intake (102) that flows through the layers having a concentric section, increasing the temperature of a fluid that circulates inside the heat-exchange tube (1).

The rotary movement (101) and the forced ventilation hot-air intake (102) generate a movement (104) of the ashes and slag, moving them through the layers having a concentric section following a path (103), to be extracted via output collectors (2).

This slag and ashes are positioned on the internal portion of the coil and move over the external surface of the heat-exchange tube (1), due to the rotary movement (101), operating as a worm screw, transforming this rotary movement into translation, following the path (103).

As can be seen in FIG. 1, when the slag and ashes reach the final end of the first cylindrical layer, they fall on the initial end of the second cylindrical layer, which has turns in the opposite direction to the first layer, such that the path that the slag undergoes in this second layer has a direction opposite to that of the first layer, in such a way that at the end of the path of this second layer reaching the final end thereof, it falls on the initial end of the third outermost layer, following a path in the same direction as the first layer, ending at the output collector (2).

The rotary movement of the heat-exchange tube (1) in addition to removing the ash and slag content from the boiler, further improves the heat exchange between the chamber and a fluid that circulates inside the heat-exchange tube (1) by allowing the hot air to more easily reach all the cavities of the exchange chamber and increase the movement of the fluid inside the tube.

Figure 2:
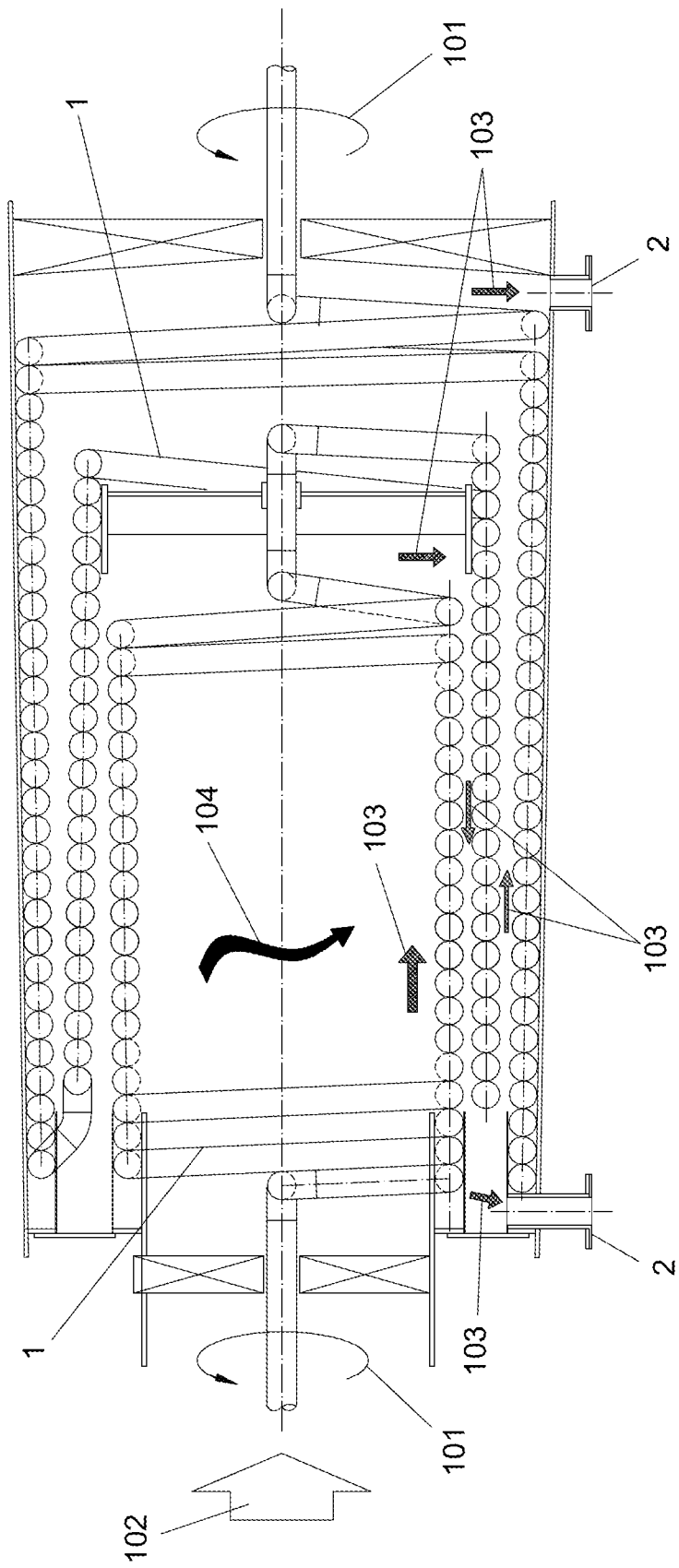
FIG. 2 is a cross-sectional elevation view of the water-tube boiler wherein the heat-exchange tube formed by three layers in the shape of a conical coil is shown, wherein the generatrices of the conical coils have a slight inclination with respect to the horizontal, the generatrices of each one of the layers being in opposite inclinations.
Figure 3:
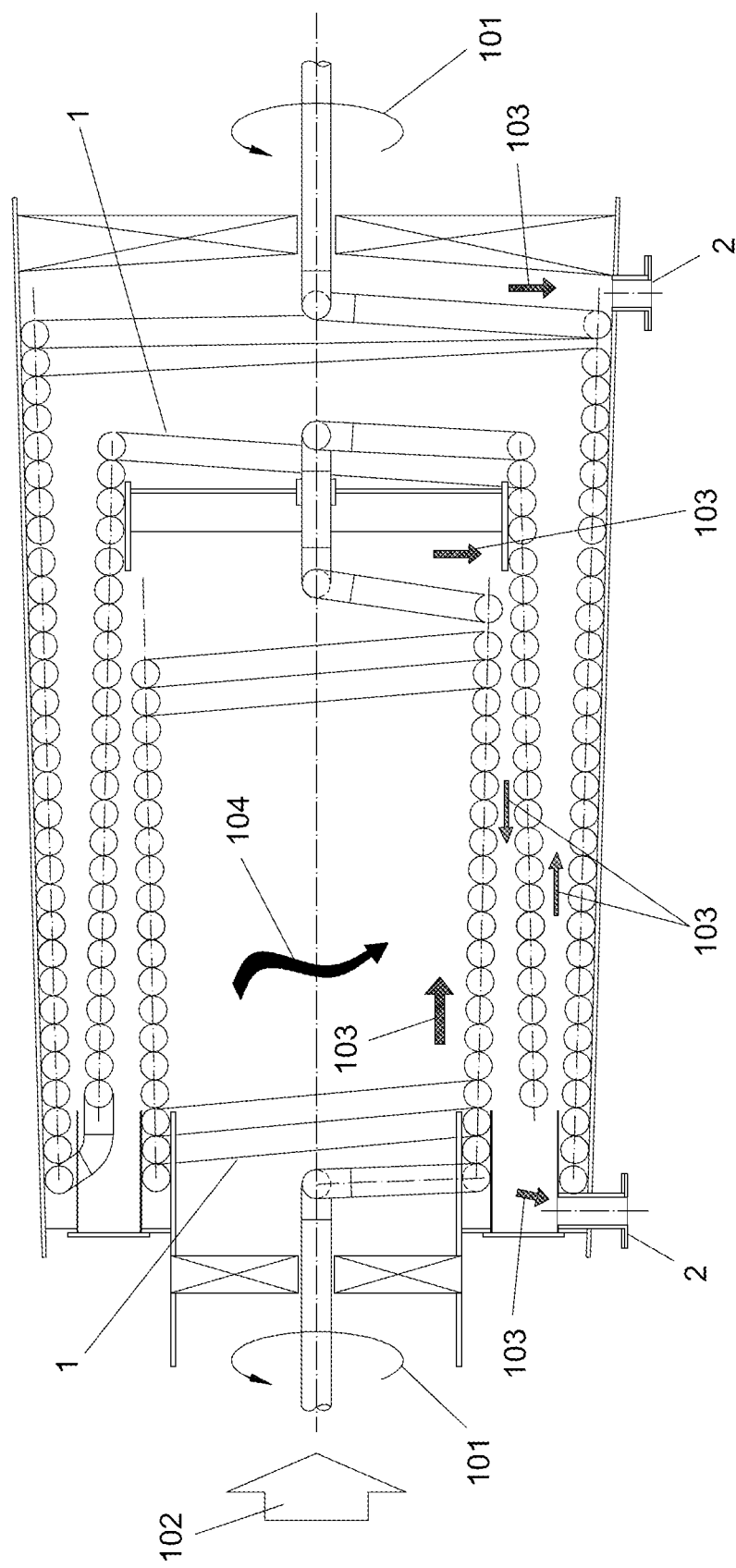
FIG. 3 represents a cross-sectional elevation view of the water-tube boiler, wherein the inclination of the generatrices of the conical coils with respect to the horizontal is greater than that represented in FIG. 2.

As shown in FIGS. 2 and 3, the heat-exchange tube (1) can have an alternative configuration in the form of a conical coil, with the turns joined in the same way as the cylindrical coil, forming three layers having a concentric section. Each one of the layers formed by the heat-exchange tube have alternately inverse conicities, that is, their generatrices have opposite inclinations with respect to the horizontal.

These layers having conical configurations can have different levels of conicity depending on the number of layers formed by the heat-exchange tube (1), the size of the elements, the volume of ash and slag to be extracted from the inside and the available space.

The rotary movement (101) of the heat-exchange tube (1) is generated by a rotor located outside the boiler, so as not to be altered by the high temperatures generated inside. In order to avoid liquid leaks, the rotary heat-exchange tube (1) has rotary valves that enable the simultaneous rotary movement of the intake and output of the fluid to be heated without leaking fluid from the inside of the tube to the outside.

The forced-ventilation hot-air intake (102) that flows through the layers having a concentric section is generated via a forced-draught fan positioned at the outlet of the heat-exchange chamber. This fan sucks in the air from inside the exchange chamber, causing the hot-air intake from the combustion chamber, generating a forced ventilation.

The present disclosure should not be limited to the embodiment described herein. Other configurations may be carried out by those skilled in the art based on the present description. Accordingly, the scope of the invention is defined by the following claims.

The invention claimed is:

1. A water-tube boiler with concentric heat-exchange coils with an ash-removal system comprising a coil-shaped heat-exchange tube wherein the coil-shaped heat-exchange tube is configured in layers having a section concentric with turns of the coils joined laterally, wherein, when the boiler is operational, the heat-exchange tube is configured to turn with a rotary movement on an axis of the coil and wherein the boiler water-tube comprises a forced-ventilation hot-air intake configured to flow through the layers having the concentric section, and to heat the coil-shaped heat-exchange tube;
   wherein the forced-ventilation hot-air intake and the rotary movement of the coil-shaped heat-exchange tube are configured to generate a movement of ash and slag, and to move the ash and slag through the layers having the concentric section following a path; and
   wherein the boiler water-tube comprises output collectors configured to extract the ash and the slag moved following the path.

2. The water-tube boiler with concentric heat-exchange coils with the ash-removal system, according to claim 1, wherein the coils of each layer, formed by the heat-exchange tube, have a cylindrical shape.

3. The water-tube boiler with concentric heat-exchange coils with the ash-removal system, according to claim 1, wherein the coils of each layer, formed by the heat-exchange tube, have a conical shape, wherein each one of the layers have alternately inverse conicities.

4. The water-tube boiler with concentric heat-exchange coils with the ash-removal system, according to claim 1, wherein the turns of the coil formed by the heat-exchange tube have an inclination in opposite directions with respect to a vertical for each layer.

5. The water-tube boiler with concentric heat-exchange coils with the ash-removal system, according to claim 1, wherein the rotary movement of the heat-exchange tube is generated by a rotor located outside the boiler.

6. The water-tube boiler with concentric heat-exchange coils with the ash-removal system, according to claim 1, wherein the heat-exchange tube has rotary valves on the outside of the boiler that enable simultaneous rotary movement of the intake and output of fluid to be heated.

7. The water-tube boiler with concentric heat-exchange coils with the ash-removal system, according to claim 1, wherein the forced-ventilation hot-air intake that flows through the layers having the concentric section is generated via a forced-draught fan.

* * * * *